United States Patent
Urey et al.

(10) Patent No.: US 7,580,189 B2
(45) Date of Patent: Aug. 25, 2009

(54) OPTICAL ELEMENT THAT INCLUDES A MICROLENS ARRAY AND RELATED METHOD

(75) Inventors: Hakan Urey, Istanbul (TR); Karlton D. Powell, Lake Stevens, WA (US)

(73) Assignee: Microvision, Inc., Redmond, WA (US)

( * ) Notice: Subject to any disclaimer, the term of this patent is extended or adjusted under 35 U.S.C. 154(b) by 134 days.

(21) Appl. No.: 11/114,937

(22) Filed: Apr. 25, 2005

(65) Prior Publication Data

US 2005/0248849 A1    Nov. 10, 2005

Related U.S. Application Data

(60) Provisional application No. 60/565,059, filed on Apr. 23, 2004.

(51) Int. Cl.
*G02B 27/10* (2006.01)
(52) U.S. Cl. .................... 359/619; 359/627
(58) Field of Classification Search ......... 359/619–629, 359/631, 633, 565, 534–535, 538, 627, 853, 359/858–859; 264/2.6
See application file for complete search history.

(56) References Cited

U.S. PATENT DOCUMENTS

| | | | | |
|---|---|---|---|---|
| 3,005,382 A | * | 10/1961 | Weber | 359/528 |
| 3,096,512 A | * | 7/1963 | Hollowich et al. | 340/815.57 |
| 4,509,823 A | * | 4/1985 | Moriguchi et al. | 359/457 |
| 4,808,181 A | * | 2/1989 | Kelman | 623/6.43 |
| 4,813,762 A | * | 3/1989 | Leger et al. | 359/565 |
| 4,952,026 A | * | 8/1990 | Bellman et al. | 359/619 |
| 5,291,334 A | * | 3/1994 | Wirth et al. | 359/622 |
| 5,420,720 A | * | 5/1995 | Gal et al. | 359/622 |
| 5,448,395 A | * | 9/1995 | Lopez et al. | 359/224 |
| 5,463,498 A | * | 10/1995 | Gal et al. | 359/622 |
| 5,494,445 A | * | 2/1996 | Sekiguchi et al. | 434/365 |
| 5,583,669 A | * | 12/1996 | Fushimi et al. | 349/5 |
| 5,684,566 A | * | 11/1997 | Stanton | 355/67 |
| 5,786,939 A | * | 7/1998 | Watanabe | 359/621 |
| 5,973,844 A | * | 10/1999 | Burger | 359/622 |
| 6,084,713 A | * | 7/2000 | Rosenthal | 359/619 |

(Continued)

OTHER PUBLICATIONS

Hecht, Eugene: Optics 4th edition, 2002, Addison Wesley at least p. 73.*

(Continued)

*Primary Examiner*—Joseph Martinez
*Assistant Examiner*—James R Greece
(74) *Attorney, Agent, or Firm*—Kevin D. Wills

(57) ABSTRACT

An optical element includes a microlens array and a reflective surface. The microlens array has a focal curve and a focal length, and the reflective surface is spaced from the focal curve. When used as an exit-pupil expander, such an optical element can often generate output beamlets that have a more uniform brightness than the output beamlets generated by a diffractive optical element. Furthermore, such an optical element can define an output-beamlet envelope having an aperture that is less wavelength-dependent than the aperture of an output-beamlet envelope defined by an exit-pupil expander that incorporates a diffractive optical element. In addition, such an optical element can often produce an image having less speckle than an exit-pupil expander that incorporates a diffractive optical element when used with one or more coherent light sources.

7 Claims, 8 Drawing Sheets

U.S. PATENT DOCUMENTS

| | | | | |
|---|---|---|---|---|
| 6,133,687 | A | * | 10/2000 | Clarke .................. 313/478 |
| 6,421,181 | B1 | * | 7/2002 | Yoshida et al. ............ 359/619 |
| 6,552,760 | B1 | * | 4/2003 | Gotoh et al. ............... 349/56 |
| 6,583,938 | B1 | * | 6/2003 | Woodgate et al. .......... 359/625 |
| 6,768,588 | B2 | | 7/2004 | Urey |
| 2001/0043163 | A1 | * | 11/2001 | Waldern et al. .............. 345/7 |
| 2004/0125048 | A1 | * | 7/2004 | Fukuda et al. ............... 345/30 |
| 2004/0184155 | A1 | * | 9/2004 | Kornblit et al. ............ 359/619 |

OTHER PUBLICATIONS

J.C. McLennan, R. Ruedy, An Investigation of the Absorption Spectra of Water and Ice, with Reference to the Spectra of the Major Planets, Proceedings of the Royal Society of London. Series A, Containing Papers of a Mathematical and Physical Character, vol. 120, No. 785 (Sep. 1, 1928), pp. 296-302 Published by: the Royal Society.*

Karlton Powell, et al., "A Novel Approach for Exit Pupil Expansion in Wearable Displays", Microvision, Inc., 2002.

Karlton Powell, et al., "Exit Pupil Expander: Image Quality Performance Enhancements and Environmental Testing Results", Microvision, Inc., 2003.

Hakan Urey, et al., "Microlens array based exit pupil expander for full color display applications", Microvision, Inc., Apr. 2004.

* cited by examiner

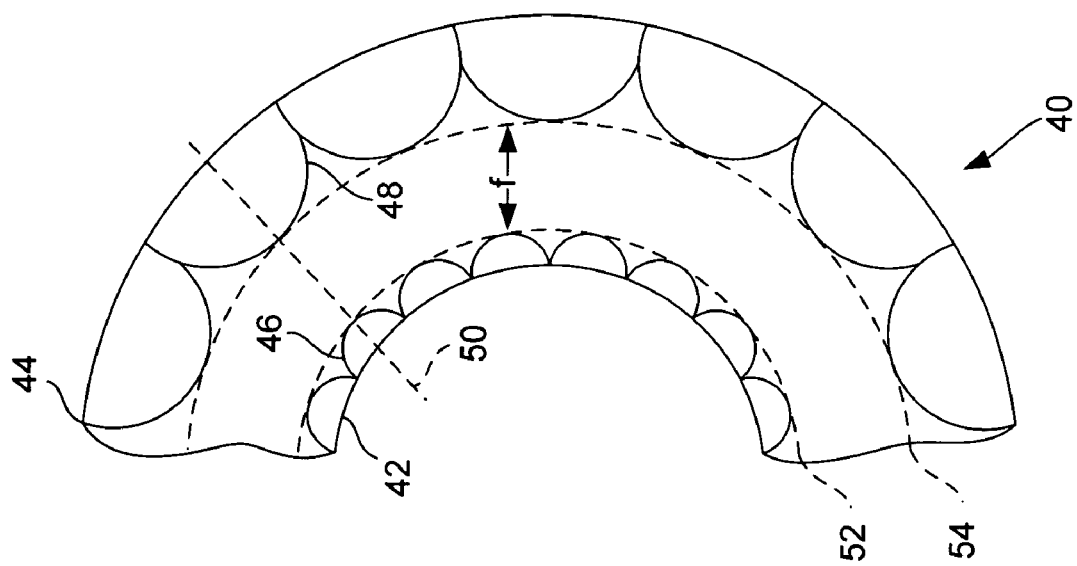

OPTICAL ELEMENT THAT INCLUDES A MICROLENS ARRAY AND RELATED METHOD

CLAIM FOR PRIORITY

This application claims priority to U.S. Provisional Application Ser. No. 60/565,059 filed on Apr. 23, 2004, which is incorporated by reference.

CROSS REFERENCE TO RELATED APPLICATIONS

This application relates to material in and incorporates by reference U.S. patent application Serial No. PCT/US05/03730 filed on Feb. 4, 2005.

FIELD OF THE INVENTION

This application relates to optical elements such as exit-pupil expanders that may be used in displays and/or other scanned beam systems, and more particularly to optical elements such as exit-pupil expanders that include one or more micro-lens arrays.

BACKGROUND

An exit-pupil expander is sometimes used in a scanned-beam display system to enlarge the aperture within which a viewer's eyes can perceive visual information, such as an image, generated by the system. An example of such a system operable as a head-mounted display is disclosed in U.S. Pat. No. 6,768,588, which is incorporated by reference.

One type of exit-pupil expander includes a diffractive optical element, such as a diffraction grating, which effectively splits an input light beam into multiple output beamlets that together define an output-beam envelope having a larger aperture than the input beam. As long as a viewer's eye is aligned with at least one of the beamlets, the viewer can substantially perceive the visual information that the input beam carries.

But unfortunately, this diffractive type of exit-pupil expander may have characteristics that are undesirable. For example, the output beamlets may have non-uniform brightness levels, particularly if the input light beam contains a wavelength different from the wavelength for which the exit-pupil expander is designed. Furthermore, for a color scanned-beam display system, the aperture of the output-beamlet envelope may exhibit relatively significant dependence on the wavelength or wavelengths of light within the input light beam. For example, for a color input beam that includes red (R), green (G), and blue (B) light, the expanded exit pupil may include overlapping R, G, and B output-beamlet envelopes having apertures of different sizes. Furthermore, a diffractive-type exit-pupil expander may make a scanned-beam display system susceptible to speckle when one or more coherent light sources are used.

SUMMARY

According to one embodiment, an optical element includes a microlens array and a reflective surface. The microlenses have at least one focal length, and the reflective surface is spaced according to the at least one focal length. In some embodiments, the microlens array is formed with a non-planar focal curve and the reflective surface is spaced from the microlens array along the non-planar focal curve of the array.

When used as an exit-pupil expander, such an optical element can often generate output beamlets that have brightness levels that are more uniform than the brightness levels of the output beamlets generated by an exit-pupil expander that incorporates a diffractive optical element. Furthermore, such an optical element can often define an output-beamlet envelope having an aperture that is less wavelength dependent than the aperture of an output-beamlet envelope defined by an exit-pupil expander that incorporates a diffractive optical element. Furthermore, such an optical element can often produce an image having less speckle than a diffractive optical element when used with one or more coherent light sources.

BRIEF DESCRIPTION OF THE DRAWINGS

Aspects and advantages of this invention will become more readily appreciated as the same become better understood by reference to the following non-limiting detailed description, when taken in conjunction with the accompanying drawings.

FIG. 2 is a side view of an optical element that is operable as an exit-pupil expander according to another embodiment of the invention.

DETAILED DESCRIPTION

The following discussion is presented to enable a person skilled in the art to make and use the invention. The general principles described herein may be applied to embodiments and applications other than those detailed below without departing from the spirit and scope of the present invention. Therefore the present invention is not intended to be limited to the embodiments shown, but is to be accorded the widest scope consistent with the principles and features disclosed or suggested herein.

Figure 1:
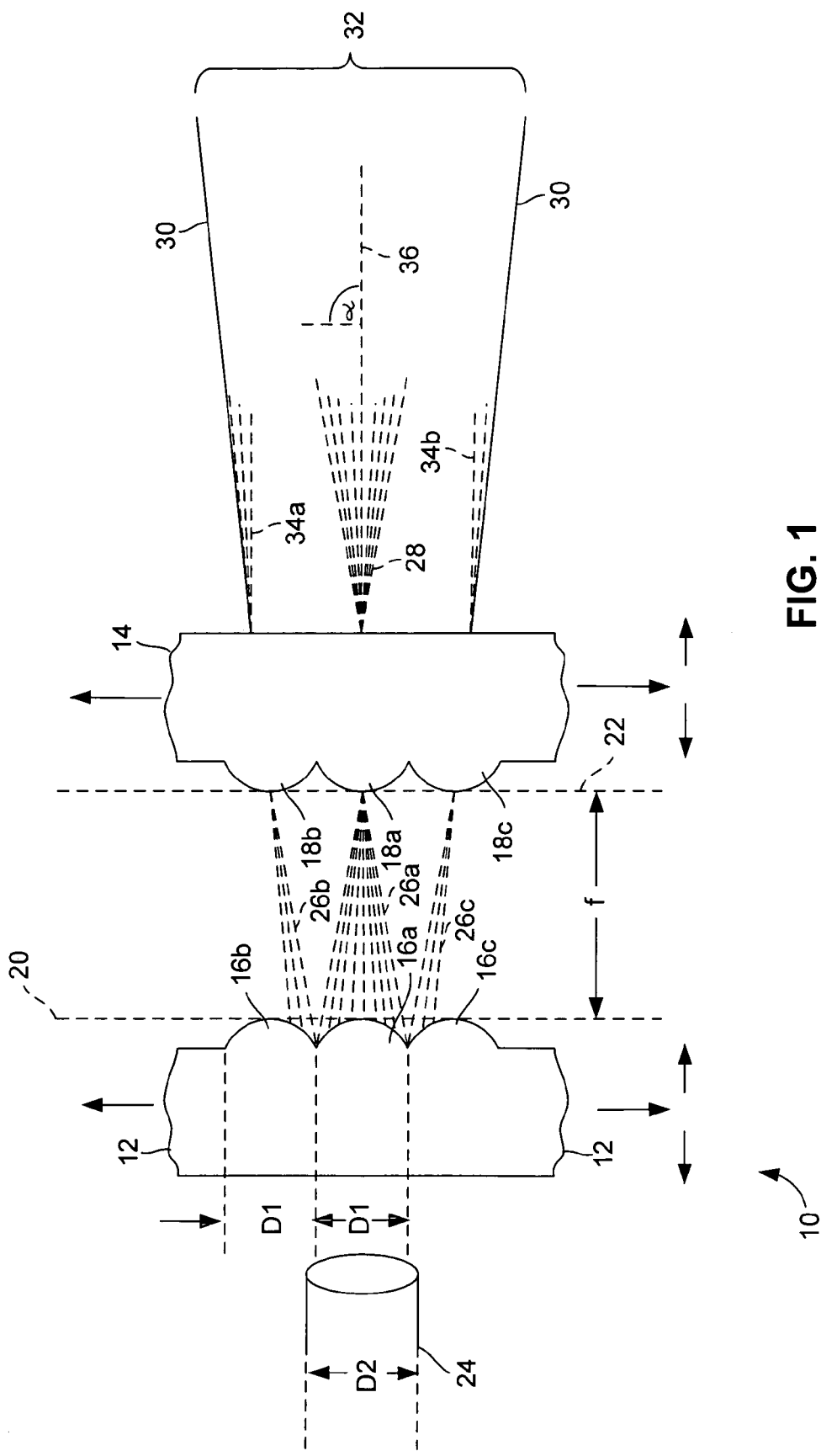
FIG. 1 is a side view of an optical element that is operable as an exit-pupil expander according to an embodiment of the invention.

FIG. 1 is a side view of an optical element 10, which can be used as an exit-pupil expander according to an embodiment. When used as an exit-pupil expander, the optical element 10 can often generate output beamlets that have brightness levels that are more uniform than the brightness levels of the output beamlets generated by an exit-pupil expander that incorporates a diffractive optical element. Furthermore, the optical element 10 can often define an output-beamlet envelope having an aperture with less wavelength dependence than the aperture of an output-beamlet envelope defined by an exit-pupil expander that incorporates only a diffractive optical element. Moreover, the optical element 10 can often produce an image having less speckle than an exit-pupil expander that incorporates a diffractive optical element when used with one or more coherent light sources.

In this embodiment, the optical element 10 is a dual-microlens array (DMLA), the structure and operation of which are discussed in "A Novel Approach for Exit Pupil Expansion in Wearable Displays", Karlton Powell, et al., "Exit Pupil Expander: Image Quality Performance Enhancements and Environmental Testing Results", Karlton Powell, et al., and U.S. Patent Application Serial No. PCT/US05/03730 filed on Feb. 4, 2005, which are incorporated by reference. Therefore, for brevity, only an overview of the optical element 10 is presented below.

The optical element 10 includes first and second microlens arrays (MLAs) 12 and 14, which are made from an optical material such as plastic or glass that is substantially transparent at the operative wavelengths and which include a number of lenslets 16 and 18, respectively. The MLA 12 has a focal curve 20, which in this embodiment is a focal plane, and a focal length f from the focal plane; likewise, the MLA 14 has a focal curve 22, which in this embodiment is a focal plane, and the same focal length f from the focal plane 22. The MLAs 12 and 14 are positioned such that their focal planes 20 and 22 are substantially parallel and are separated by the focal length f, and the gap between the MLAs is filled with a relatively low-refractive-index material such as air, for example. In this depiction, each lenslet 16 and 18 has a width $D_1$, which is the pitch of the MLAs 12 and 14 in the depicted plane, and each lenslet 16 corresponds to a lenslet 18.

A summary of the operation of the optical element 10 according to an embodiment of the invention is now provided.

A beam generator (not shown in FIG. 1) generates an input light beam 24, which may, for example, be a beam that at any one time can include an R, G, or B wavelength or any combination thereof. Furthermore, the beam 24 has an aperture $D_2$ that may, for example, be approximately 10% wider than the lenslet width $D_1$. The beam 24 propagates in a direction that is substantially perpendicular to the focal planes 20 and 22, and has a substantially symmetrical intensity profile such as, for example, a Gaussian intensity profile.

When the beam 24 is aligned with a lenslet (here the lenslet 16a), the MLA 12 converts the input light beam 24 into one or more intermediate light beams 26, here three intermediate beams 26a-26c in the vertical dimension. The overlap of the beam 24 on the lenslets 16b and 16c causes the MLA 12 to generate the intermediate beams 26b and 26c. Consequently, the MLA 12 typically generates one intermediate beam 26 for each lenslet 16 that the beam 24 overlaps. Furthermore, because the beam 24 may overlap lenslets 16 in the horizontal dimension (perpendicular to the page of FIG. 1), the MLA 12 may generate other intermediate beams not shown. Moreover, as the beam 24 sweeps across the MLA 12, at times the beam will overlap fewer lenslets 16, and thus the MLA will, at these times, generate fewer intermediate beams 26.

The MLA 14 converts the intermediate light beam 26a into a center output beam 28, which at least partially defines an envelope 30 of an expanded output beam 32; the MLA 14 may also convert the light beams 26b and 26c into side output beams 34a and 34b, respectively, which also compose the expanded output beam 32. A center ray 36 of the expanded beam 30 makes an angle α with the focal plane 22 of the MLA 14. If the input beam 24 is perpendicular to the focal planes 20 and 22 as shown in FIG. 1, then α=90°.

Beam 24 is scanned, typically in two dimensions, across the optical element 10 while being modulated according to an image pattern. In the far field, the expanded output beam 32, along with expanded output beams corresponding to other positions of the beam 24, cooperate to form an expanded exit pupil (not shown in FIG. 1) within which substantially the entire scanned image is visible to a viewer.

Because the center output beam 28 is generated by refraction, the aperture of the envelope 30 of the expanded beam 32 can be relatively independent of wavelength. That is, the envelope 30 has substantially the same aperture regardless of the wavelength or wavelengths of light that compose the input beam 24. Consequently, the aperture of the expanded exit pupil (not shown) is also relatively wavelength independent.

If the MLA 14 generates no output side beams 34, then the expanded beam 32 contains only a single beamlet having an envelope. The MLA 14 generates no output side beams if the input beam 24 overlaps no more than one lenslet 16. The size of the lenslets relative to the input beam and/or the size of the input beam relative to the lenslets may be modified to provide a variable exit-pupil size.

If the MLA 14 generates the output side beams 34, then the expanded beam 32, and thus the expanded exit pupil (not shown in FIG. 1), contains multiple beamlets (not shown) at any instant in time. In the far field, the side beams 34 interfere with the center beam 28 to yield an expanded beam 32 having beamlets. The beamlets, which are typically designed to have spacing smaller than the size of the viewer's pupil, cooperate to provide the viewer with the impression of a continuous image having substantially uniform intensity across the expanded exit pupil. The optical element 10 can provide the expanded exit pupil having a size that is relatively independent of wavelength.

Still referring to FIG. 1, alternate embodiments of the structure and operation of the optical element 10 are contemplated. For example, the gap between the MLAs 12 and 14 may be filled with a transmission medium other than air. For example, the fill medium may be a solid to resist gap compression or expansion that may alter the optical properties of the optical element 10, and one can alter the properties (e.g., pitch, lenslet curvature, index of refraction) of the MLAs 12 and 14 in a conventional manner to compensate for the different index of refraction (relative to the index of refraction of air) of the fill medium. Furthermore, the aperture $D_2$ of the input light beam 24 can be any size other than substantially 10% greater than the lenslet pitch $D_1$. In addition, because the aperture of the envelope 30 of the expanded output beam 32 depends on the distance between the focal planes 20 and 22, one may set the aperture of the envelope 30 to a desired size by setting the focal lengths of lenslets 16 and 18 and the corresponding distance between the focal planes to another focal length f. Alternatively, the distance between the MLAs 12 and 14 may be adjusted somewhat as shown by the horizontal arrows while holding the focal lengths of lenslets 16 and 18 constant to adjust the angle of envelope 30, the intensity profile across the envelope 30, and other optical properties of the envelope. Furthermore, because the angle α at which the center ray 36 of the expanded beam 32 leaves the MLA 14 depends on the alignment between the MLAs 12 and 14, one may set α to a desired value by moving the lenslets 16 out of alignment with the lenslets 18 as shown by the vertical arrows. In addition, the optical element 10 may allow one to adjust α by moving of one of the MLAs 12 and 14 relative to the other MLA in a dimension shown by the vertical arrows so as to adjust the lenslet alignment. This adjustment may be automated so that a system can track the expanded exit pupil (not shown in FIG. 1) to movements of a viewer's eye (not shown). Moreover, although described as including R, G, and B wavelengths, the beam 24 may include other wavelengths that render a monochrome, dichrome, or full-color image.

FIG. 2 is a side view of an optical element 40, which, like the optical element 10 of FIG. 1, is a DMLA that is operable as an exit-pupil expander according to an embodiment. The optical element 40 differs from the optical element 10 in that the element 40 includes curved MLAs 42 and 44, which respectively include lenslets 46 and 48. Corresponding pairs of lenslets 46 and 48 are aligned such that the input light beam 24 (FIG. 1) sweeps through radial paths 50, which are coincident with the center axes of both lenslets of these respective lenslet pairs. Consequently, the curved optical element 40 may allow one to omit a telecentric lens (not shown in FIG. 2) between the input beam 24 and the MLA 42. The MLAs 42 and 44 each have the same focal length f in the radial dimension, and have respective focal curves 52 and 54, which are concentric and are spaced apart by f in the radial dimension. Moreover, the optical element 40 operates similarly to the optical element 10.

Still referring to FIG. 2, alternate embodiments of the structure and operation of the optical element 40 are contemplated, including alternate embodiments that incorporate features similar to those features discussed above in conjunction with FIG. 1. For example, one may set/adjust the aperture of the envelope 30 of the expanded beam 32 (FIG. 1) to a desired size, or set/adjust the uniformity, and or other desired optical properties of the expanded beam, by setting/adjusting the distance between the focal curves 52 and 54 and/or the focal lengths of the lenslets 46 and 48. Furthermore, one may set the angle α (FIG. 1) to a desired value by rotating one of the MLAs 42 and 44 relative to the other MLA about a center point (not shown) common to both of the focal curves 50 and 52. This adjustment may be automated so that a system can track the expanded exit pupil (not shown in FIG. 2) to movements of a viewer's eye (not shown). Moreover, although described as being spherical, the focal curves 50 and 52 may be non-spherical, according to application preferences.

Figure 3:
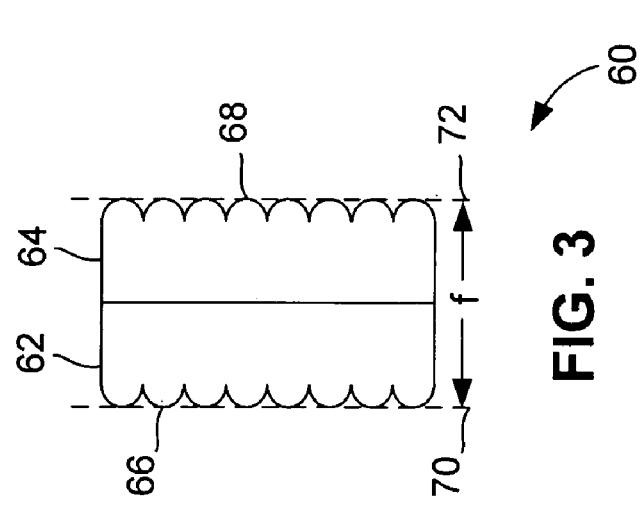
FIG. 3 is a side view of an optical element that is operable as an exit-pupil expander according to another embodiment of the invention.

FIG. 3 is a side view of an optical element 60, which, like the optical element 10 of FIG. 1, is a DMLA that is operable as an exit-pupil expander according to an embodiment. The optical element 60 differs from the optical element 10 in that the element 60 includes joined MLAs 62 and 64 that respectively include aligned lenslets 66 and 68 that face away from each other, not toward each other like the lenslets 16 and 18 of FIG. 1. Consequently, the optical element 60 lacks an air gap between the MLAs 62 and 64. Furthermore, the MLAs 62 and 64 each have the same focal length f in a dimension perpendicular to the respective focal planes 70 and 72, which are spaced apart by f. Moreover, the optical element 60 operates similarly to the optical element 10.

Still referring to FIG. 3, alternate embodiments of the structure and operation of the optical element 60 are contemplated, including alternate embodiments that incorporate features that are similar to those features discussed above in conjunction with FIGS. 1-2. For example, the optical element 60 may be curved like the optical element 40. Furthermore, the optical element 60 may be formed as a single piece instead of by joining the MLA 62 to the MLA 64.

Figure 4:
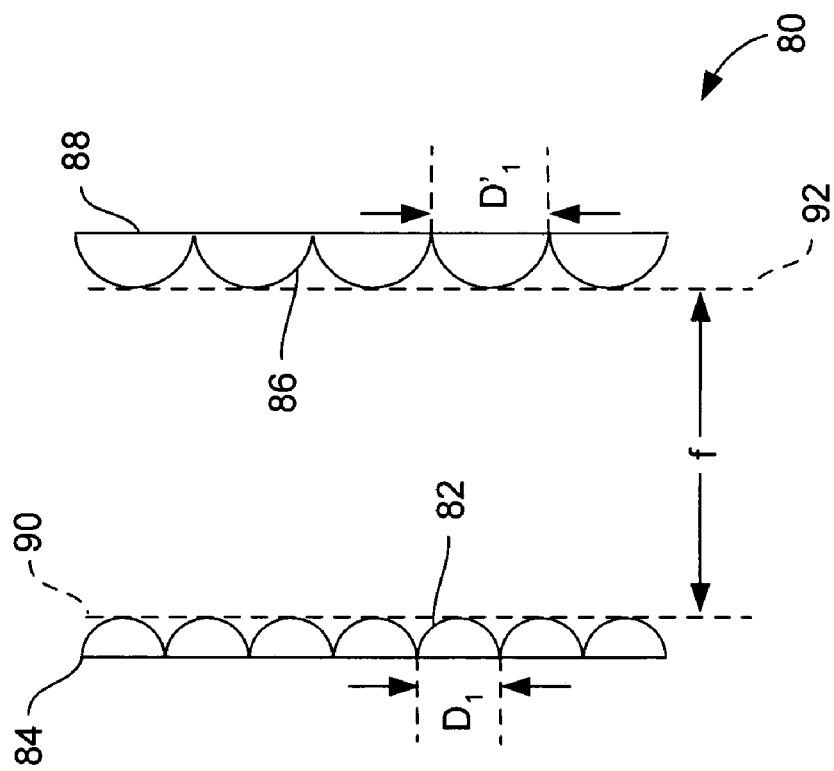
FIG. 4 is a side view of an optical element that is operable as an exit-pupil expander according to yet another embodiment of the invention.

FIG. 4 is a side view of an optical element 80, which, like the optical element 10 of FIG. 1, is a DMLA that is operable as an exit-pupil expander according to an embodiment. But the optical element 80 differs from the optical element 10 in that lenslets 82 of an MLA 84 have a different pitch than the lenslets 86 of the other MLA 88. More specifically, like the optical element 10, the optical element 80 includes an MLA 84 having the lenslet pitch $D_1$. But unlike the optical element 10, the optical element 80 includes a second MLA 88 having a different lenslet pitch $D'_1 > D_1$, which may allow one to omit a telecentric lens (not shown in FIG. 4). The MLA 84 also has a focal length f and a focal plane 90. Similarly, the MLA 88 has the focal length f and a focal plane 92 that is located a distance f from the focal plane 90.

Still referring to FIG. 4, alternate embodiments of the structure and operation of the optical element 80 are contemplated, including alternate embodiments that incorporate features that are similar to those features discussed above in conjunction with FIGS. 1-3. For example, the pitch $D'_1$ of the lenslets 86 may be less than, not greater than, the pitch $D_1$ of the lenslets 82.

Figure 5:
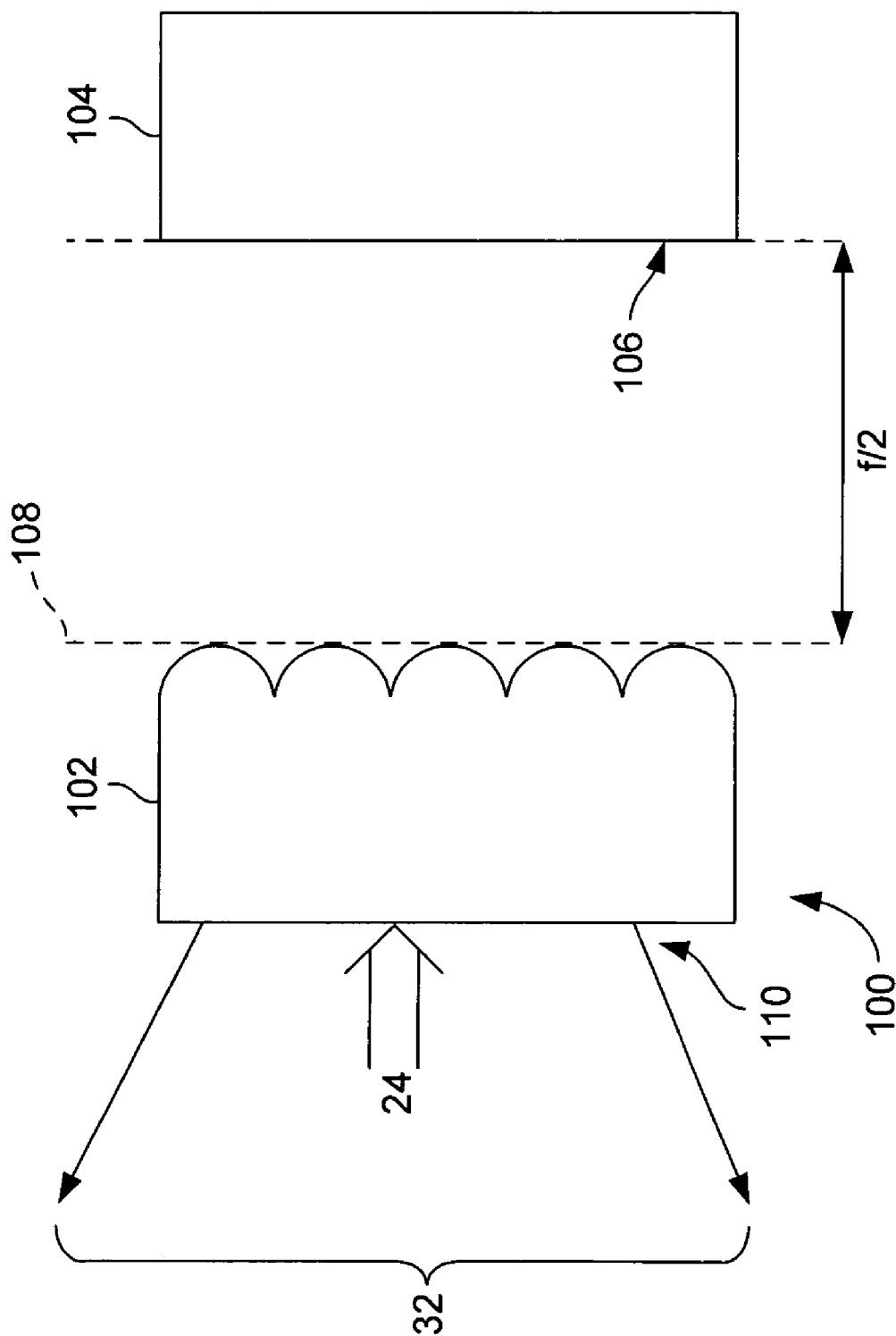
FIG. 5 is a side view of an optical element that is operable as an exit-pupil expander according to another embodiment of the invention.

FIG. 5 is a side view of an optical element 100, which, like the optical element 10 of FIG. 1, is operable as an exit-pupil expander according to an embodiment. Like the optical element 10 of FIG. 1, the optical element 100 includes an MLA 102. But the element 100 differs from the element 10 in that it includes a reflector 104 instead of a second MLA. The reflector 104 includes a planar reflecting surface 106, which is located f/2 from a focal plane 108 of the MLA 102. Consequently, the expanded output beam 32 propagates to the expanded exit pupil (not shown in FIG. 5) from a front side 110 (i.e., the same side into which the input light beam 24 propagates) of the MLA 102. The reflector 104 effectively allows the single MLA 102 to operate as the two MLAs of the optical elements 10, 40, 60, and 80 of FIGS. 1-4; therefore, the optical element 100 is a "pseudo" DMLA because it operates like a DMLA but includes only a single MLA 102. Consequently, the optical element 100 may be easier to manufacture than the optical elements 10, 40, 60, and 80 because it does not require alignment of two MLAs.

Still referring to FIG. 5, alternate embodiments of the structure and operation of the optical element 100 are contemplated, including alternate embodiments that incorporate features that are similar to those features discussed above in conjunction with FIGS. 1-4. Moreover, the reflecting surface 106 may be disposed inside of or on the back surface of the reflector 104 such that a beam (not shown in FIG. 5) output by the MLA 102 propagates through a portion of the reflector 104 before striking the reflecting surface. When the reflecting surface 106 is so disposed, the distance of the front surface of the reflector 104 from the MLA 102 may be modified to compensate for the thickness of the reflector 104 through which a beam propagates before striking the reflecting surface 106 such that the reflecting surface 106 is substantially f/2 from the focal plane 108.

Figure 6:
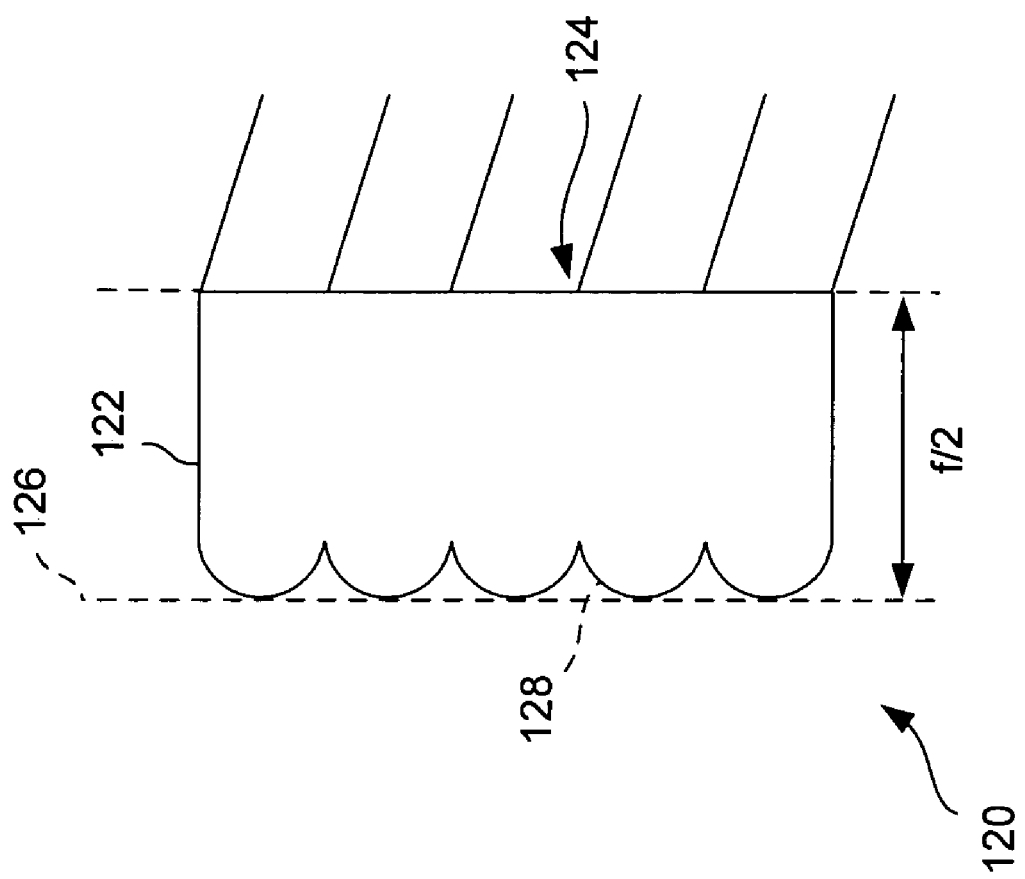
FIG. 6 is a side view of an optical element that is operable as an exit-pupil expander according to still another embodiment of the invention.

FIG. 6 is a side view of an optical element 120, which, like the optical element 100 of FIG. 5, is a pseudo DMLA that is operable as an exit-pupil expander according to an embodiment. Like the element 100 of FIG. 5, the optical element 120 includes a single MLA 122 and a reflective surface 124, which is located f/2 from a focal plane 126 of the MLA. But the element 120 differs from the element 100 in that the lenslets 128 of the MLA 122 face away from, not toward, the reflective surface 124. Furthermore, the optical element 100 may be easier to manufacture than the optical element 100 because the reflective surface 124 can be formed integral with the MLA 122. For example, the surface of the MLA 122 opposite the lenslets 128 can be treated with a reflective coating to form the reflective surface 124.

Still referring to FIG. 6, alternate embodiments of the structure and operation of the optical element 120 are contemplated, including alternate embodiments that incorporate features that are similar to those features discussed above in conjunction with FIGS. 1-5.

Figure 7:
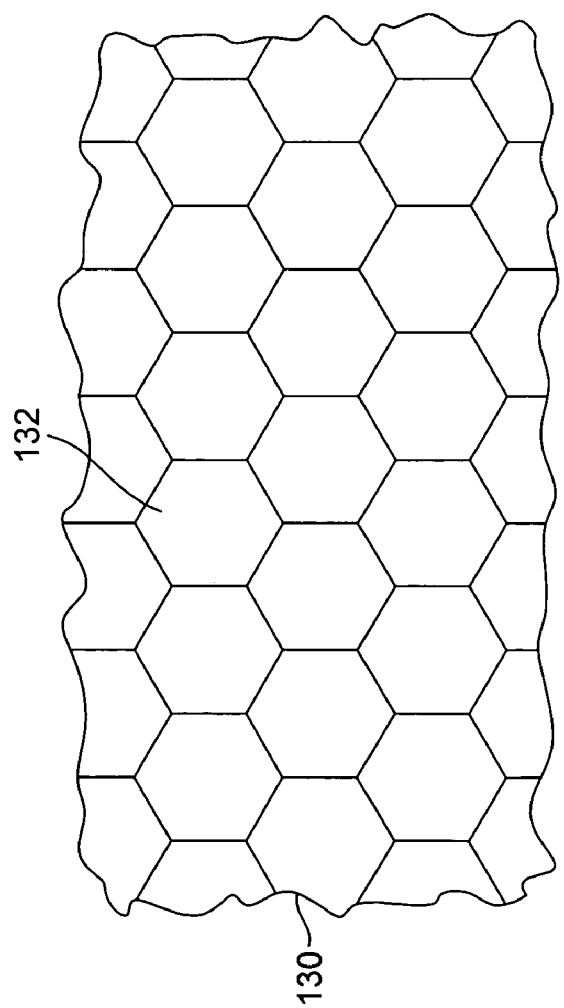
FIG. 7 is a plan view of a microlens array that the optical elements of FIGS. 1-6 can incorporate according to an embodiment of the invention.

FIG. 7 is a plan view of portion of an MLA 130, which the optical elements 10, 40, 60, 80, 100, and 120 of FIGS. 1-6 can incorporate as one or both of their MLAs according to an embodiment. The MLA 130 includes lenslets 132, which have a hexagonal footprint, are arranged in a "honeycomb" pattern, and are contiguous such that there are no spaces between adjacent lenslets where the lenslets join the backplane of the MLA. The structure and operation of the MLA 130 and of DMLAs and pseudo DMLAs that include a pair of MLAs 130 are further discussed in previously incorporated U.S. Patent Application Ser. No. PCT/US05/03730, filed on Feb. 4, 2005.

Still referring to FIG. 7, alternate embodiments of the MLA 130 are contemplated. For example, the lenslets 132 may have a footprint that is not hexagonal, and may be arranged in a pattern other than a honeycomb pattern. According to one embodiment, lenslets 132 have rectilinear footprints and are arranged in a corresponding rectilinear pattern. Furthermore, some of the lenslets 132 may have a different footprint (e.g., different size, different shape) than other lenslets 132. For example, a set of lenslets in a portion of the DMLA may be sized and spaced to provide visibility of a corresponding portion of the image across a particular far-field eyebox, while lenslets in a different portion of the field of view may be sized, spaced, and aligned to provide visibility of the corresponding portion of the image across an overlapping or entirely different eyebox. This may be used, for example, to provide mission-critical information to locations outside the nominal viewing area. Accordingly a substantially full-screen view could be displayed within a nominal eyebox while a "ticker" (e.g. a set of critical gauges) of mission-critical information is modulated across small regions near the top and bottom of the DMLA, for example. Lenslets in the "ticker" regions may be aligned, arranged, and sized to project the "ticker" information to areas peripheral to the eyebox, thus allowing a viewer to see the mission-critical information even when circumstances (such as high gravitational loads for example) force the viewer's eye(s) out of the eyebox. Such a projected peripheral region could alternatively be used to alert the user to his or her drifting out of the eyebox, thus warning the user to correct display alignment, seating position, etc., or for other purposes.

Figure 8:
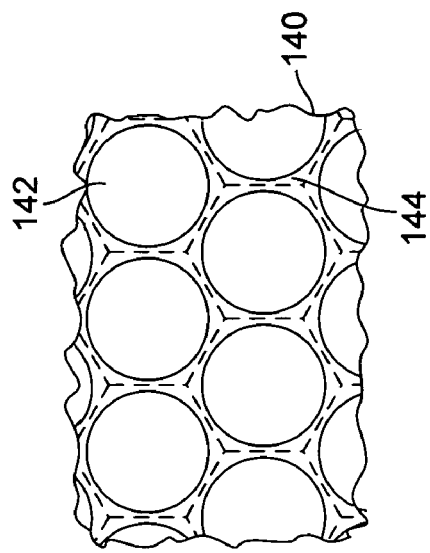
FIG. 8 is a plan view of a microlens array that the optical elements of FIGS. 1-6 can incorporate according to another embodiment of the invention.

FIG. 8 is a plan view of a portion of an MLA 140, which the optical elements 10, 40, 60, 80, 100, and 120 of FIGS. 1-6 can incorporate as one or both of their MLAs according to an embodiment. The MLA 140 differs from the MLA 130 of FIG. 7 in that lenslets 142 are not fully contiguous with one another at the MLA backplane, and thus exposed regions 144 of the backplane between adjacent lenslets 142 are not part of any lenslet. These exposed regions, i.e., spaces, 144 are often the result of a manufacturing process that does not or cannot form fully contiguous lenslets 142. But by treating the spaces 144 with an opaque coating, the spaces often have little or no adverse affect on the operation of an optical element that incorporates one or more MLAs 140. Where an optical element includes multiple MLAs 140, the spaces 144 on fewer than all of the MLAs, may be treated with an opaque coating. For example, in a DMLA, the spaces 144 of only the MLA on the input side of the DMLA may be so treated.

Still referring to FIG. 8, alternate embodiments of the MLA 140 are contemplated, including alternate embodiments that incorporate features that are similar to those features discussed above in conjunction with FIG. 7. Furthermore, fewer than all of the spaces 144 may be treated with an opaque coating.

Figure 9:
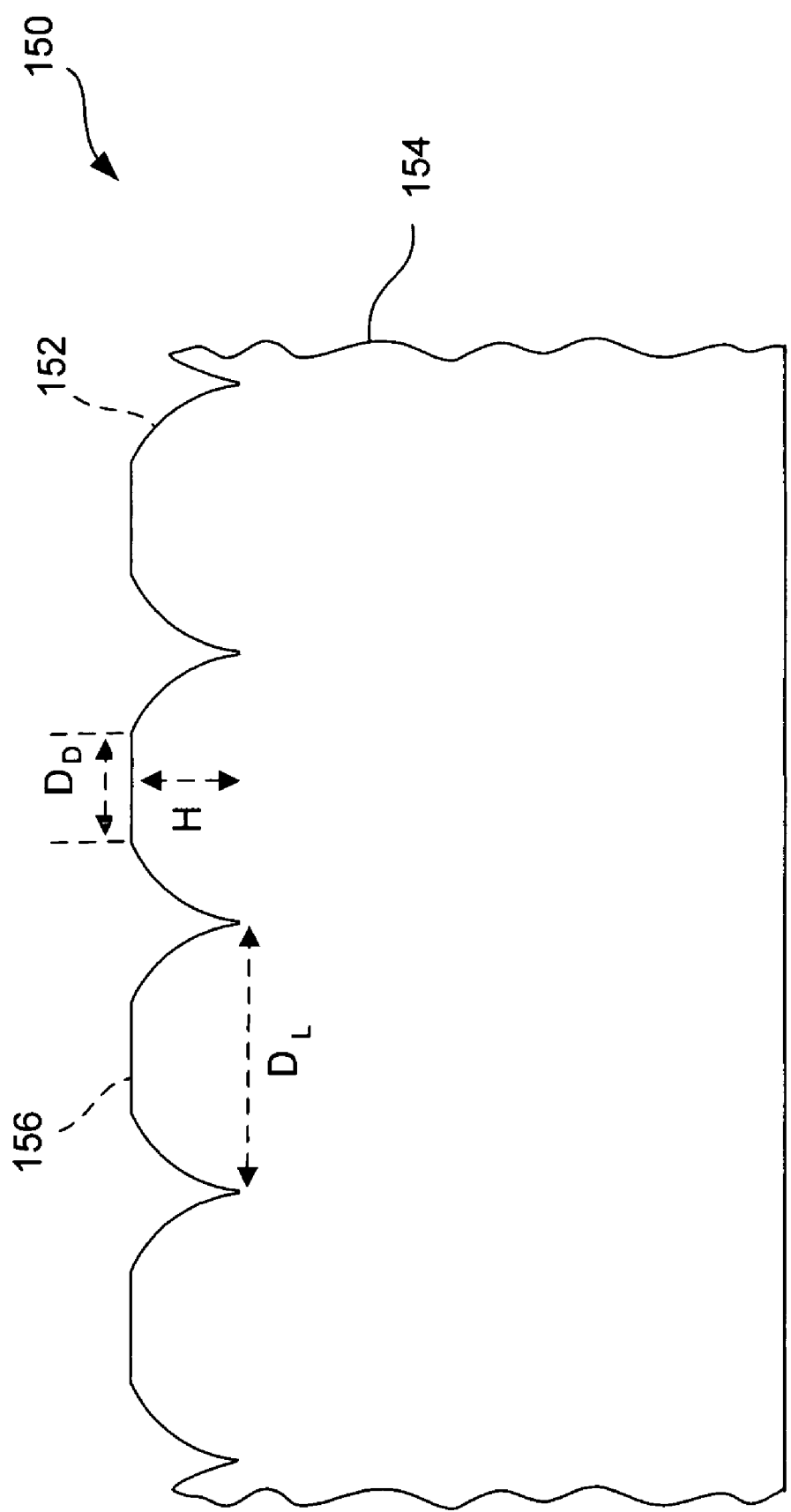
FIG. 9 is a side view of a microlens array that the optical elements of FIGS. 1-6 can incorporate according to yet another embodiment of the invention.

FIG. 9 is a side view of a portion of an MLA 150, which the optical elements 10, 40, 60, 80, 100, and 120 of FIGS. 1-6 can incorporate as one or both of their MLAs according to an embodiment. The MLA 150 may also incorporate one or more of the features of the MLAs 130 and 140 of FIGS. 7-8.

The MLA 150 includes spherical lenslets 152, which have a height H from a backplane 154, and which have a width (pitch) $D_L$ where the lenslets emerge from the backplane. H and $D_L$ may be varied to adjust the optical properties of the MLA 150, although in one embodiment H is no greater than the diameter of the lenslets.

Each lenslet 152 also includes a deformity 156, which here is a flattened region of the lenslet surface centered at the tip of the lenslet. The deformity 156 has a width $D_D$, which is no more than 10% of $D_L$, and may be a remnant of the manufacturing process, or may have another cause. To limit or eliminate the adverse affects that the deformities 156 may have on the optical performance of the MLA 150, one can treat the deformities 156 with an opaque coating, which may be similar to the coating used to treat the spaces 144 between the lenslets 142 of FIG. 8.

Still referring to FIG. 9, alternate embodiments of the MLA 150 are contemplated. For example, the lenslets 152 may have a hyperbolic or other non-spherical shape. Furthermore, some of the lenslets 152 may have no deformity 156, and the lenslets that do have deformities may have them at locations other than centered at the lenslet tip. Moreover, the deformity width $D_D$ may be greater than 10% of $D_L$, and fewer than all of the deformities 156 may be treated with an opaque coating. In addition, not all of the lenslets 152 may have the same height H or width $D_L$.

Figure 10:
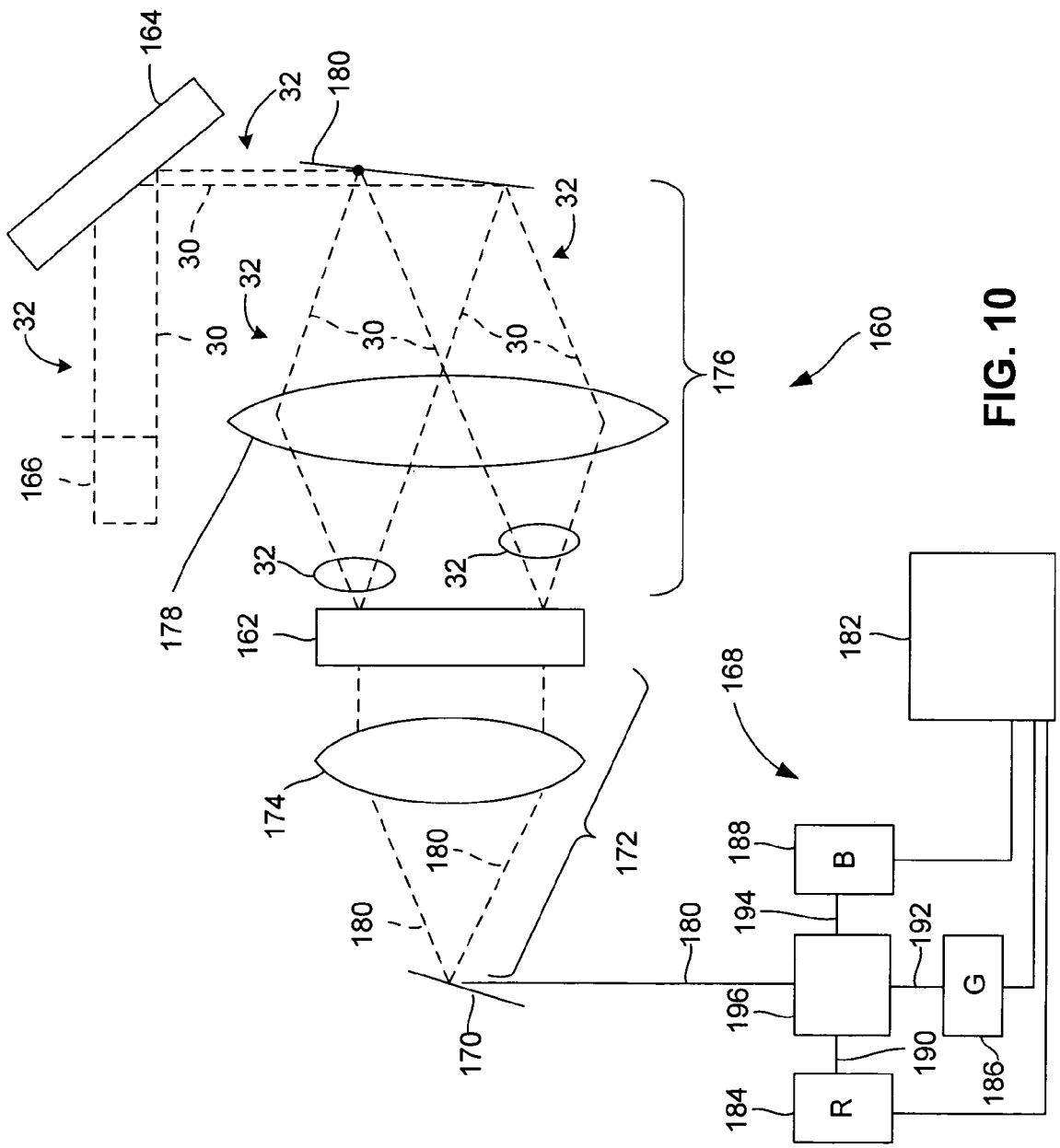
FIG. 10 is a diagram of a heads-up display system that can incorporate one of the optical elements of FIGS. 1-6 as an exit-pupil expander according to an embodiment of the invention.

FIG. 10 is a diagram of a scanned-beam heads-up display 160, which is an example of a system that can incorporate as an exit-pupil expander 162 one of the optical elements 10, 40, 60, 80, 100, and 120 of FIGS. 1-6 according to an embodiment. Also shown is a wind shield 164, which the display 160 uses as a reflector to direct a virtual image into an expanded exit pupil 166—because the exit pupil is a three dimensional box, it is sometimes referred to as a viewing space or eye box. Furthermore, the display 160 may be part of a larger system, such as an automobile (not shown). Further details of the structure and operation of the display 160 are discussed in previously incorporated U.S. patent application Ser. No. PCT/US05/03730, filed on Feb. 4, 2005; therefore, only a summary of the display is provided below.

The heads-up display 160 includes a beam generator 168, a scanner 170, a scanned-beam-conditioning assembly 172, which includes a lens 174, the exit-pupil expander 162, and a beam-projection assembly 176, which includes a lens 178 and a reflector 180 or a combined lens-reflector. Both the beam-conditioning assembly 172 and the beam-projection assembly 176 may be or include respective optical trains.

The beam generator 168 generates a color output beam 180, and includes image electronics 182, red (R), green (G), and blue (B) beam sources 184, 186, and 188 for respectively generating R, G, and B beams 190, 192, and 194, and a beam-combiner-and-conditioner assembly 196.

Electronics 182 modulate the R, G, and B beam sources 184, 186, and 188, and thus the beams 190, 192, and 194, such that the output beam 180 has the desired intensity and color content for a pixel of the image that the electronics is currently generating. The electronics 182 may modulate the beam sources using time modulation, where a beam is full "on" for a predetermined portion of the pixel-generation time and full "off" for another portion of the pixel-generation time, or using intensity modulation, where the intensity of a beam is modulated to a predetermined level for an entire pixel-generation time.

The beam-combiner-and-conditioner assembly 196 combines the R, G, and B beams 190, 192, and 194 into the output beam 180.

The scanner 170 sweeps the output beam 180 in two dimensions (e.g., vertical and horizontal) to generate a virtual image viewed by the operator (not shown in FIG. 10) in the expanded exit pupil 166—two positions of the swept output beam are shown emanating from the scanner in dashed line. The scanner 170 may be a conventional microelectromechanical system (MEMS) scanner, or other type of scanner.

The scanned-beam conditioning assembly 172 conditions the swept output beam 180 for input to the exit-pupil expander 162. For example, the lens 174 is a conventional telecentric lens that causes the swept output beam 180 to enter the exit-pupil expander 162 normal to the focal plane (not shown in FIG. 10) of the expander regardless of the beam's angular position. Furthermore, the assembly 172 may include other conventional components.

The exit-pupil expander 162 converts the swept beam 180 at the expander's input plane into the expanded beam 32, which includes beamlets (not shown) within the envelope 30—two positions of the envelope are shown in dashed line. The expanded beam 32 is a larger, i.e., expanded, version of the beam 180, and the expanded beams 32 corresponding to each scan position of the beam 180 together eventually form the expanded exit pupil 166. That is, as the scanner 170 sweeps the beam 180, the expanded beam 32 effectively "sweeps out" the exit pupil 166. More specifically, as the scanner 170 sweeps the beam 180, the beamlets within the envelope 30 generate the image in the expanded exit pupil 166 by sweeping across the retinas of the operator's eyes (not shown).

The beam-projection assembly 176 conditions the expanded beam 32 from the exit-pupil expander 162 for direction into the expanded exit pupil 166 by the wind shield 164. For example, the lens 178 is a conventional focusing lens, and the reflector 180 is an aspheric mirror having a curvature designed to optically "match" the curvature of the wind shield 164. The assembly 176 may also include a negative-power lens (not shown) at the output of the exit-pupil expander 162 to further expand the beam 32 before it propagates to the lens 178. Furthermore, the assembly 176 may include other conventional components.

Still referring to FIG. 10, alternative embodiments of the display 160 are contemplated. For example, instead of sweeping a combined single beam 180, the scanner 170 may simultaneously receive and sweep multiple beams, where the beams have a suitable spacing and timing delay between them so that at the expanded exit pupil they can form pixels having appropriate registration relative to one another. As an example of this, scanner 170 may receive and sweep the R, G, and B beams 190, 192, and 194, which overlap at the expanded exit pupil to form full-color pixels. Alternatively, the swept beams may be the same color and sweep out separate tiles of the image. Furthermore, the beams 190, 192, and 194 may be colors other than R, G, and B that together can form a full-color pixel.

From the foregoing it will be appreciated that, although specific embodiments of the invention have been described herein for purposes of illustration, various modifications may be made without deviating from the spirit and scope of the invention.

What is claimed is:

1. A scanned beam display, comprising:
   a beam generator to generate a beam modulated according to an image to be displayed;
   a scanner capable of receiving the beam and scanning the beam to generate a raster scan of the image to be displayed; and
   an exit pupil expander receiving the raster scan of the image, the exit pupil expander comprising:
   a first microlens array comprising two or more lenslets arranged to have a focal length, wherein one of the two or more lenslets of the first microlens array has a width approximately equal to a pitch of the two or more lenslets of the first microlens array; and
   a reflector disposed at a distance of approximately one-half of the focal length from the microlens array;
   wherein the raster scan of the image applied to the first microlens array reflects off the reflector as an image of the first microlens array operating as a second microlens array and exits the first microlens array in an expanded exit pupil within which substantially an entirety of the image may be visible to a viewer.

2. A scanned beam display as claimed in claim 1, wherein the first microlens array has a substantially planar focal curve.

3. A scanned beam display as claimed in claim 1, wherein the first microlens array has a non-planar focal curve.

4. A scanned beam display as claimed in claim 1, wherein the distance between the first microlens array and the reflector is selected with respect to the focal length of the first microlens array to provide a desired angle at which the expanded exit pupil is disposed with respect to the first microlens array.

5. A scanned beam display as claimed in claim 1, wherein the distance between the first microlens array and the reflector is selected with respect to the focal length of the first micro lens to provide a desired intensity profile within the expanded exit pupil.

6. A scanned beam display as claimed in claim 1, wherein the distance between the first microlens array and the reflector is selected with respect to the focal length of the first micro lens array to provide a reduced speckle in the image compared with speckle in an image generated using a diffractive element for an exit pupil expander if the beam comprises coherent light.

7. A scanned beam display as claimed in claim 1, further comprising a non-air transmission medium disposed in a gap between the first microlens array and the reflector.

* * * * *